UNITED STATES PATENT OFFICE.

EMIL WILHELM MAYER, OF HAMBURG, GERMANY, ASSIGNOR TO THE FIRM OF ANTIGNIT-GESELLSCHAFT MIT BESCHRÄNKTER HAFTUNG, OF SCHLEUSENHOF, GERMANY.

FIRE-EXTINGUISHING COMPOUND.

No. 836,265.  Specification of Letters Patent.  Patented Nov. 20, 1906.

Application filed July 7, 1905. Serial No. 268,730.

*To all whom it may concern:*

Be it known that I, EMIL WILHELM MAYER, a subject of the German Emperor, and a resident of Hamburg, Germany, (whose post-office address is 8 Schleusenbrücke, Schleusenhof,) have invented certain new and useful Improvements in Fire-Extinguishing Means, of which the following is a specification.

This invention has for its object a fire-extinguishing means in the form of an emulsion which acts in such a manner that it surrounds the burning object with an air-excluding crust and also generates gases unfavorable to combustion.

The means in accordance with the present invention differs from known substances for the same purpose by its thoroughly reliable and very speedy action, also because it contains no corrosive or poisonous substances, does not generate any poisonous vapors, and will not readily freeze even at the lowest temperatures.

This novel fire-extinguishing means is obtained by dissolving a mixture of sodium chlorid, burnt alum, bicarbonate of soda, and sulfate of ammonia in water. In another quantity of water glycerin, magnesium chlorid, sodium silicate, acetic amyl oxid, and formaldehyde are dissolved in the order given, and this second solution is then mixed with the first. The mutual reactions of the solutions form deposits, which, however, owing to the addition of the glycerin, sink but slowly to the bottom, and as they constitute a specially effective constituent of the fire-extinguishing medium they should be allowed to remain in the liquid.

The liquid may be prepared in advance and kept for any length of time, only needing stirring before use in order to mix the deposit with the liquid. The composition may be used in fire-sprinklers, extinguishers, nozzles, buckets, &c. As already stated, owing to the glycerin that it contains the insoluble constituents remain floating for a long time in the liquid, and the glycerin, in combination with the salts also, prevents the freezing of the liquid. The formalin and acetic amyl oxid act as an antiseptic.

Suitable proportions for the first solution are two hundred liters of water, three thousand two hundred and fifty grams sodium chlorid, three hundred and thirty grams burnt alum, three hundred and twenty grams bicarbonate of soda, and two hundred grams ammonium sulfate. For the other liquid four thousand six hundred grams water, two hundred and fifty grams glycerin, one hundred and fifty grams magnesium chlorid, two thousand five hundred grams sodium-silicate solution of 26° Baumé, two grams acetic amyl oxid, and thirty-five grams formaldehyde, forty per cent. solution.

Having fully described my said invention, what I claim, and desire to secure by Letters Patent, is—

1. Fire-extinguishing means, consisting of an aqueous solution of common salt, alum, bicarbonate of soda and sulfate of ammonia, to which liquid an aqueous solution of glycerin, magnesium chlorid and sodium silicate is subsequently added, substantially as and for the purpose set forth.

2. A fire-extinguishing compound containing an aqueous solution of a chlorid and a carbonate of a metal of the alkalies and an aqueous solution containing a viscous liquid capable of holding precipitates formed in suspension, a chlorid of a metal of an alkaline earth and a silicate of a metal of the alkalies, said substances forming an incrustation and giving off a gas incapable of supporting combustion, substantially as described.

3. Fire-extinguishing means such as described consisting of a solution of three thousand two hundred and fifty grams sodium chlorid, three hundred and thirty grams burnt alum, three hundred and twenty grams bicarbonate of soda and two hundred grams sulfate of ammonia in two hundred liters of water, and an addition of a solution of two hundred and fifty grams glycerin, one hundred and fifty grams magnesium chlorid, two thousand five hundred grams sodium silicate at 26° Baumé, two grams acetic amyl oxid and thirty-five grams formaldehyde forty per cent. solution in four thousand six hundred grams water, substantially as set forth.

4. A fire-extinguishing compound containing an aqueous solution of a chlorid and a bicarbonate of a metal of the alkalies and burnt alum and aqueous solution containing a polyatomic alcohol, a chlorid of a metal of the alkaline earths, a silicate of a metal of the alkalies and an antiseptic, said substances forming an incrustation and giving off a gas incapable of supporting combustion, substantially as described.

EMIL WILHELM MAYER.

Witnesses:
MAX KAEMPFF,
ERNEST H. L. MUMMENHOFF.